(No Model.)

E. VERNY.
JOURNAL BOX.

No. 423,461. Patented Mar. 18, 1890.

WITNESSES:
Chas. B. Shumway
Frederic N. Blanc

INVENTOR
Etienne Verny
by Bartley & Knight
Attys

UNITED STATES PATENT OFFICE.

ETIENNE VERNY, OF REAUMONT, FRANCE.

JOURNAL-BOX.

SPECIFICATION forming part of Letters Patent No. 423,461, dated March 18, 1890.

Application filed September 12, 1889. Serial No. 323,720. (No model.)

*To all whom it may concern:*

Be it known that I, ETIENNE VERNY, a citizen of France, residing at Reaumont, France, have invented certain new and useful Improvements in Journal-Boxes, of which the following is a specification.

My invention relates to journal-boxes, such as are used especially for railway-axles; and it consists in devices for lubricating the journal with a constant supply of clean oil. It is illustrated in the accompanying drawings, in which—

Figure 1:
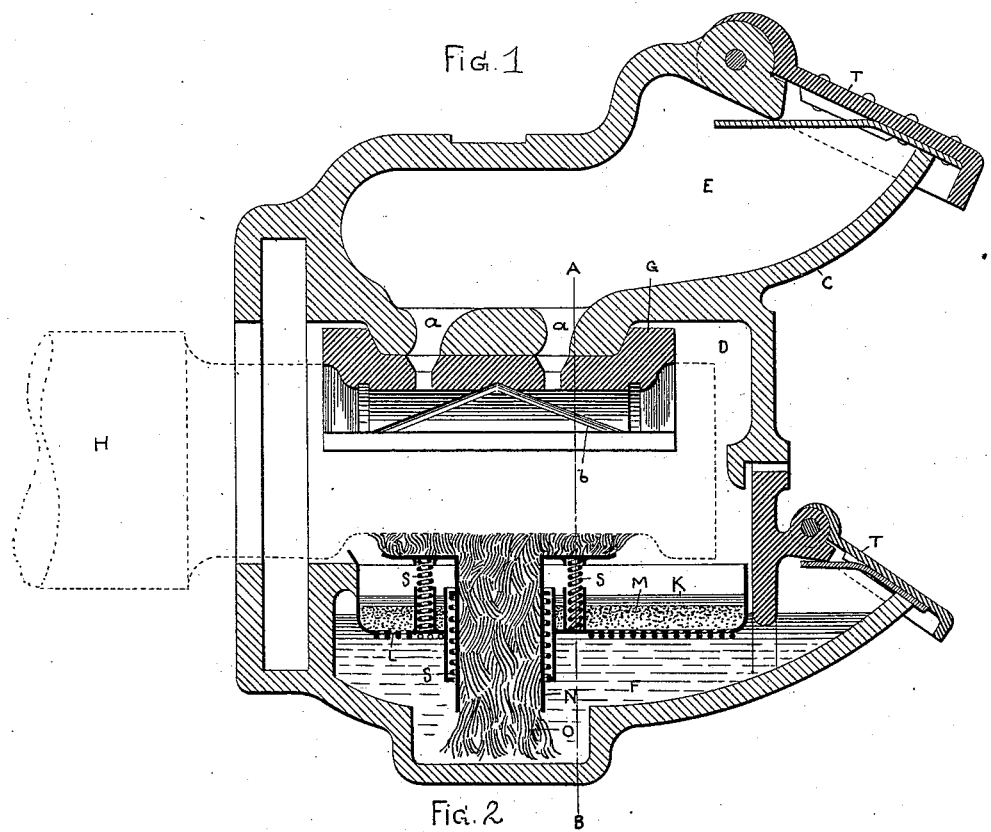
Figure 2:
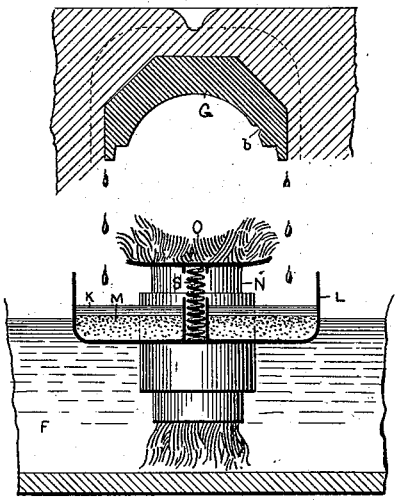

Figure 1 is a longitudinal and Fig. 2 a transverse section of my box, the latter section being taken on the line A B of Fig. 1.

In the drawings, C is the main box having a central cavity D for the journal, an upper cavity E for the fresh oil, and a lower cavity F for the filtered oil. In the axle-cavity is fitted the brass G, adapted to rest upon the axle H, (shown in dotted lines,) and in turn forms a resting place for the box upon which the load is placed in the ordinary manner. The brass G is provided with small openings or ducts $a$ coincident with corresponding openings in the bottom of oil-cavity E. It is also provided with interior grooves $b$ in a well-known manner. Between the axle-cavity D and the lower oil-cavity F is placed a removable filter K of peculiar construction. This filter is made of a sheet-metal pan L, having a perforated bottom or a bottom of fine wire-gauze, upon which is placed a layer of granulated material M—for example, fine lead shot. Through the center of this pan is passed a tube N, carryng a wick O and supported by springs S against the lower surface of axle H. Both of the oil-cavities are provided with suitable lids T, and the lower half of the box is easily detached for the removal and renewal of the filter and wick.

The operation of the apparatus, as described, is as follows: All the parts being in place, the upper lid T is opened and the cavity E filled with oil. This will gradually work down by ducts $a$ onto the axle H, where it is distributed by means of grooves $b$. After performing its function of lubricating the axle, the oil gradually drops, as shown in Fig. 2, onto the filter K. After passing through the filter it drops into the lower cavity F, in a clean condition, where it is absorbed by wick O and drawn up against the under side of the axle, whence it again drops off onto the filter and is cleansed, as before. By this means the axle is constantly supplied with clean oil, both above and below, and is lubricated in the most thorough manner possible. This construction has proved of great value in practice. In an ordinary railway journal-box it has been found that a quart of oil will be passed through the filter and applied to the journal in twenty-four hours, so that the circulation is complete, while there is very little loss in the process.

What I claim as new, and desire to secure by Letters Patent, is—

1. The combination, with a journal, of a removable filter beneath the journal, and a wick passing through the filter from the oil-cavity beneath it to the journal.

2. The combination, with a journal-box, of a filter of granulated material adapted to catch the oil after it has been used on the journal, and a wick leading from the cavity containing the filtered oil to the journal to be lubricated.

3. The combination, with a journal-box, of a filter of granulated material adapted to receive the oil after its application to the journal, and means for applying the cleansed oil to the journal.

4. The combination, with the journal-box, of a removable filter consisting of a perforated receptacle containing a layer of granulated material.

5. The combination, with a journal-box, of a removable filter and a wick attached thereto.

6. The combination, with a journal-box, of a filter consisting of a perforated metallic pan containing a layer of granulated material, a wick O, passing through the said filter, and provided with springs for pressing it against the journal.

7. The combination, in a journal-box, of a filter formed by horizontal pan L, containing a layer of granulated material, a wick O, passing through the said pan, provided with a tube or carrier N, and springs for pressing it against the journal.

8. The combination, with an axle-box, of a removable filter beneath the journal and inside the said box, consisting of a perforated pan or holder having a layer of granulated material.

Signed this 28th day of August, 1889.

ET. VERNY.

In presence of—
R. J. PRESTON,
DAVID T. S. FULLER.